U S009117453B2

(12) United States Patent
Bielby

(10) Patent No.: US 9,117,453 B2
(45) Date of Patent: Aug. 25, 2015

(54) METHOD AND SYSTEM FOR PROCESSING PARALLEL CONTEXT DEPENDENT SPEECH RECOGNITION RESULTS FROM A SINGLE UTTERANCE UTILIZING A CONTEXT DATABASE

(75) Inventor: Gregory J. Bielby, Pointe-Claire (CA)

(73) Assignee: Volt Delta Resources, LLC, Orange, CA (US)

(*) Notice: Subject to any disclaimer, the term of this patent is extended or adjusted under 35 U.S.C. 154(b) by 601 days.

(21) Appl. No.: 12/982,146

(22) Filed: Dec. 30, 2010

(65) Prior Publication Data

US 2011/0161077 A1 Jun. 30, 2011

Related U.S. Application Data

(60) Provisional application No. 61/291,509, filed on Dec. 31, 2009.

(51) Int. Cl.
| | |
|---|---|
| *G10L 15/00* | (2013.01) |
| *G10L 17/00* | (2013.01) |
| *G10L 21/00* | (2013.01) |
| *G10L 15/32* | (2013.01) |
| *G10L 15/22* | (2006.01) |
| *G06F 17/28* | (2006.01) |
| *G10L 17/02* | (2013.01) |
| *G10L 15/26* | (2006.01) |

(52) U.S. Cl.
CPC ............... *G10L 15/32* (2013.01); *G10L 15/22* (2013.01); *G06F 17/289* (2013.01); *G10L 15/265* (2013.01); *G10L 17/02* (2013.01)

(58) Field of Classification Search
CPC ....... G10L 15/32; G10L 15/22; G10L 15/265; G06F 17/289

USPC .................................................. 704/277, 235
See application file for complete search history.

(56) References Cited

U.S. PATENT DOCUMENTS 5,855,000 A * 12/1998 Waibel et al. ................. 704/235
7,167,545 B2    1/2007 Plannerer et al.
(Continued)

OTHER PUBLICATIONS

Young, Lee W., International Search Report for PCT/US10/62563 as mailed Mar. 18, 2011, 3 pages.
(Continued)

*Primary Examiner* — Farzad Kazeminezhad
(74) *Attorney, Agent, or Firm* — Winstead PC

(57) ABSTRACT

A method of and system for accurately determining a caller response by processing speech-recognition results and returning that result to a directed-dialog application for further interaction with the caller. Multiple speech-recognition engines are provided that process the caller response in parallel. Returned speech-recognition results comprising confidence-score values and word-score values from each of the speech-recognition engines may be modified based on context information provided by the directed-dialog application and grammars associated with each speech-recognition engine. A context database is used to further reduce or add weight to confidence-score values and word-score values, remove phrases and/or words, and add phrases and/or words to the speech-recognition engine results. In situations where a predefined threshold-confidence-score value is not exceeded, a new dynamic grammar may be created. A set of n-best hypotheses of what the caller uttered is returned to the directed-dialog application.

18 Claims, 6 Drawing Sheets

(56) References Cited

U.S. PATENT DOCUMENTS

| | | | |
|---|---|---|---|
| 7,228,275 B1* | 6/2007 | Endo et al. | 704/235 |
| 7,340,042 B2 | 3/2008 | Cluff et al. | |
| 7,881,451 B2 | 2/2011 | Chang | |
| 2002/0193991 A1* | 12/2002 | Bennett et al. | 704/247 |
| 2005/0033582 A1* | 2/2005 | Gadd et al. | 704/277 |
| 2005/0080632 A1 | 4/2005 | Endo et al. | |
| 2006/0004570 A1 | 1/2006 | Ju et al. | |
| 2006/0069564 A1 | 3/2006 | Allison et al. | |
| 2008/0091435 A1 | 4/2008 | Strope et al. | |
| 2009/0089236 A1* | 4/2009 | Lamprecht et al. | 706/46 |
| 2009/0100340 A1 | 4/2009 | Paek et al. | |
| 2012/0143607 A1* | 6/2012 | Longe et al. | 704/235 |

OTHER PUBLICATIONS

Chirokas, Steve, et al.; "Catch the Next Wave to Caller Satisfaction with Unique Voice Recognition Technology"; Oct. 2, 2009; 8 pages.

* cited by examiner

METHOD AND SYSTEM FOR PROCESSING PARALLEL CONTEXT DEPENDENT SPEECH RECOGNITION RESULTS FROM A SINGLE UTTERANCE UTILIZING A CONTEXT DATABASE

CROSS-REFERENCE TO RELATED APPLICATIONS

This U.S. patent application claims priority from, and incorporates by reference the entire disclosure of, U.S. Provisional Patent Application 61/291,509, filed on Dec. 31, 2009.

BACKGROUND

1. Technical Field

The present invention relates generally to the field of speech recognition and directed-dialog application automation and, in particular, but not by way of limitation, to a method of and system for processing multiple speech-recognition results from a single spoken utterance.

2. History of Related Art

Speech recognition refers to technology capable of recognizing spoken language and converting the spoken language to a representative analog or digital form of the spoken language. For example, the speech recognition may translate the spoken language into text, binary, sounds, codes, and the like for use in performing other functions. Speech-recognition technologies recognize the spoken language without being targeted at a single speaker and are typically designed for multiple-user applications. For example, speech recognition may be used in directory-assistance applications with public switched telephone network (PSTN) systems.

Directory assistance has existed virtually since the onset of the public switched telephone system. As telephone networks grew in complexity, increased demand for directory-assistance services followed and automation became necessary to control costs associated with providing listing information to callers. Many of the directory-assistance services are implemented through automated prompting and speech-recognition systems that are known in the art. Computers executing computer programs comprising machine-readable instructions are typically utilized to recognize names and numbers spoken by a requesting caller.

For example, during a typical free directory-assistance call in the United States, a caller dials a specific phone number such as, for example, 1-800-CALLERS, for a local exchange area and receives a pre-recorded prompt as part of a directed-dialog application flow such as, for example, "For what city please?" Once the city name is uttered by the caller, there is typically a further prompt as defined by the directed-dialog application flow such as, for example, "For what listing?" In response to the further prompt and depending on the response the caller gives, a desired telephone number is provided to the caller through a synthesized speech announcement. However, if the desired telephone number is unlisted or if the caller's verbal utterance is not recognized by the automated prompting and speech-recognition system, the directory-assistance system so informs the caller and the caller is required to hang up (i.e., disconnect the call) without having obtained the desired telephone number of the listing and must use other directory-assistance means.

Other directory-assistance services allow the caller to call a directory-assistance operator and request a telephone number of a listing. Directory-assistance operators find telephone numbers for listings responsive to a caller's request. If the requested telephone number is listed, the directory-assistance operator communicates the telephone number of the listing to the caller. Most directory-assistance services that use a live directory-assistance operator currently charge to look-up of names, addresses, and telephone numbers. These directory-assistance charges are often found by customers to be excessive; as such, many customers seek to avoid them.

SUMMARY OF THE INVENTION

A system comprising a directed-dialog-processor server having a directed-dialog-processor application executing thereon, a speech-recognition-engine server having a plurality of parallel-operable speech-recognition-engine applications executing thereon, a context database, and a multiple-recognition-processor server in data communication with the directed-dialog-processor server, the speech-recognition-engine server, and the context database and having a multiple-recognition-processor application executing thereon. The multiple-recognition-processor server is operable, via the multiple-recognition-processor application, to receive context information and a forwarded caller response from the directed-dialog-processor application, select a set of parallel-operable speech-recognition-engine applications from the plurality of parallel-operable speech-recognition-engine applications, combine the context information with additional context information from the context database to form modified context information, forward to each speech-recognition-engine application in the selected set the modified context information, the forwarded caller response, and a request to perform a speech recognition of the forwarded caller response, and receive from each speech-recognition application in the selected set an n-best list comprising at least one confidence-score value and at least one word-score value.

A method comprising providing a processor and a memory interoperably coupled to the processor and having computer-readable processor instructions stored thereon. The processor and the memory are used in combination with the computer-readable processor instructions to perform at least one of receiving context information and a forwarded caller response from a directed-dialog-processor application executing on a directed-dialog-processor server, selecting a set of parallel-operable speech-recognition-engine applications from a plurality of parallel-operable speech-recognition-engine applications executing on a speech-recognition-engine server, combining the context information received from the directed-dialog-processor application and additional context information from a context database, thereby forming modified context information, forwarding modified context information, the forwarded caller response, and a request to perform a speech recognition of the forwarded caller response to each speech-recognition-engine application selected in the selecting step, and receiving from each speech-recognition application of the set of speech recognition engine applications an n-best list comprising at least one confidence-score value and at least one word-score value.

A computer-program product comprising a non-transitory computer-usable medium having computer-readable processor instructions embodied therein, the non-transitory computer-readable processor instructions adapted to be executed to implement a method comprising providing a processor and a memory interoperably coupled to the processor and having computer-readable processor instructions stored thereon. The processor and the memory are used in combination with the computer-readable processor instructions to perform at least one of receiving context information and a forwarded caller response from a directed-dialog-processor application executing on a directed-dialog-processor server, selecting a set of parallel-operable speech-recognition-engine applications from a plurality of parallel-operable speech-recognition-engine applications executing on a speech-recognition-engine server, combining the context information received from the directed-dialog-processor application and additional context information from a context database, thereby forming modified context information, forwarding modified context information, the forwarded caller response, and a request to perform a speech recognition of the forwarded caller response to each speech-recognition-engine application selected in the selecting step, and receiving from each speech-recognition application of the set of speech recognition engine applications an n-best list comprising at least one confidence-score value and at least one word-score value.

The above summary of the invention is not intended to represent each embodiment or every aspect of the present invention.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Existing speech-recognition systems typically incorporate a single search-recognition engine. One drawback of using a single search-recognition engine is that, if the single search-recognition engine fails to recognize a spoken utterance, the speech-recognition system will often indicate that the spoken utterance was either not recognized or generate an error condition. This makes the speech-recognition system using a single search-recognition engine inflexible and reduces the overall speech-recognition accuracy and usefulness.

Figure 1:
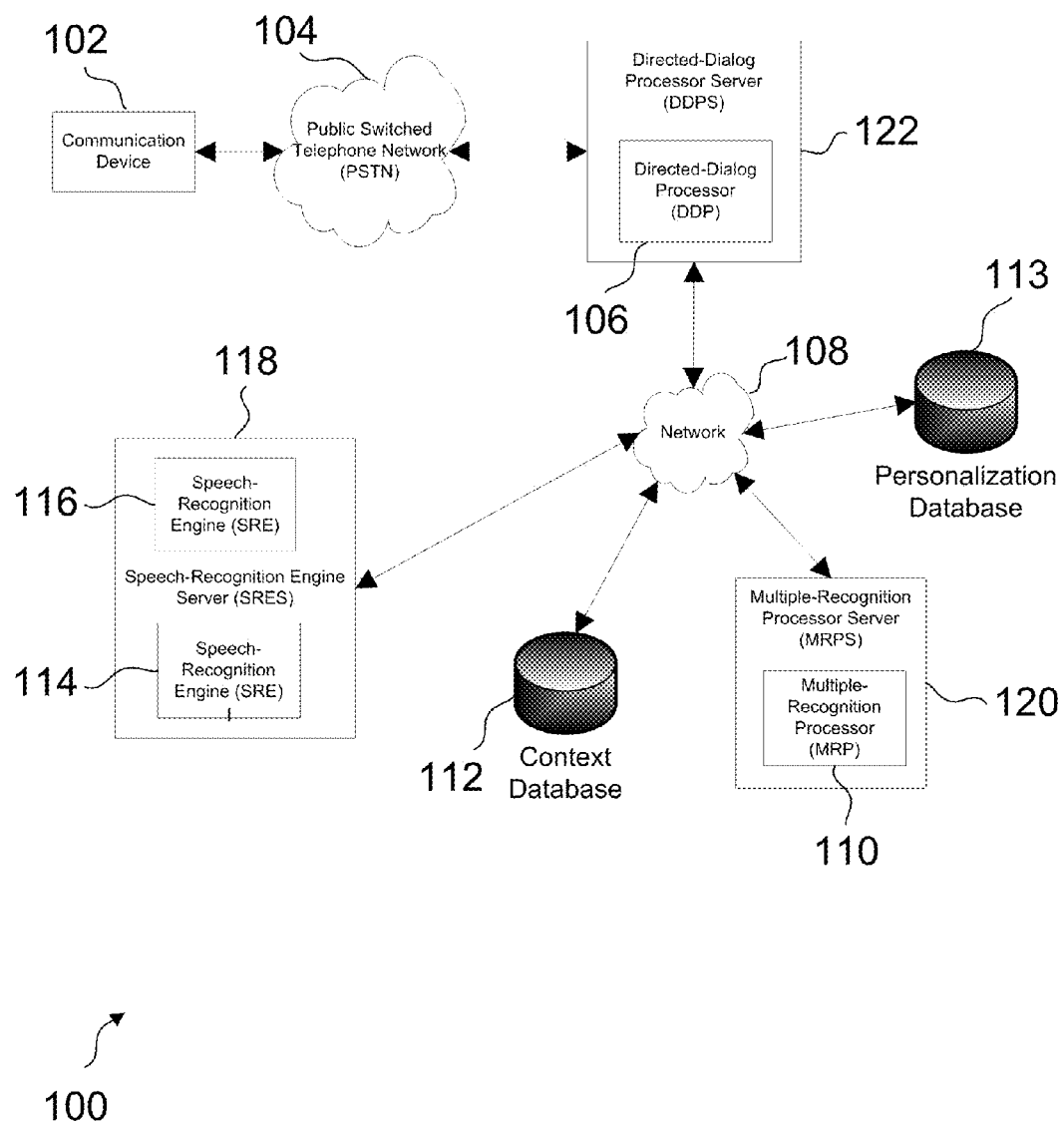
FIG. 1 is a block diagram illustrating a multiple speech-recognition-engine system.

Turning now to the FIGURES, FIG. 1 is a block diagram of a multiple speech-recognition-engine system 100. The system 100 includes a Communication Device 102, a Directed-dialog-processor Server (DDPS) 122, a Speech-recognition-engine Server (SRES) 118, a Multiple-recognition-processor Server (MRPS) 120, a Context Database 112, and a Personalization Database 113. The Communication Device 102 and the DDPS 122 are operable to communicate via a Public Switched Telephone Network (PSTN) 104. The DDPS 122 has resident and operating thereon a Directed-Dialog Processor (DDP) 106 that executes a directed-dialog application flow. The SRES 118 has resident and operating thereon a plurality of Speech Recognition Engines (SRE) 114, 116. In a typical embodiment, the SRES 118 may include physical or virtual hardware for assisting in recognizing speech patterns. For illustrative purposes, two SREs 114, 116 are shown; however, in various embodiments, any number of SREs may be utilized. The MRPS 120 has resident and operating thereon a Multiple-Recognition Processor (MRP) 110. The DDPS 122, the SRES 118, the MRPS 120, the Context Database 112, and the Personalization Database 113 are operable to communicate via a Network 108.

For purposes of illustration, various server computers such as, for example, the DDPS 122, the SRES 118, and the MRPS 120, are depicted in FIG. 1. One of ordinary skill in the art will appreciate that each instance of a server computer may, in various embodiments, represent a plurality of server computers. For example, the SRE 116 and the SRE 114 may, in various embodiments, be resident and operating on distinct physical or virtual server computers. Likewise, although various server computers are illustrated separately in FIG. 1, in various embodiments, fewer server computers may be utilized. For example, in various embodiments, the MRP 110 and SREs 114, 116 may be resident and operating on one physical or virtual server computer.

The DDPS 122 is operable to provide a caller associated with the Communication Device 102 with access to the DDP 106 via the PSTN 104. In various embodiments, the Communication Device 102 may be, for example, a wireline telephone, a wireless telephone, a smartphone telephone, a voice-over-internet-protocol (VOIP) telephone, a satellite telephone, a personal computer (PC), or the like. Although described in conjunction with the PSTN 104, concepts of the invention are equally applicable to wireless or Internet telephony directed-dialog applications.

The DDP 106 is operable to communicate over the Network 108 with the MRP 110. The DDP 106 is operable to control interaction with the Communication Device 102 and the MRP 110. The DDP 106 may also accept non-voice input from the Communication Device 102 such as touch tones, input from buttons or keyboards on smartphones, etc. Speech recognition is typically not used when the caller uses these types of entry. In a typical embodiment, the DDP 106 may also be connected to other systems, databases, or networks to receive and transmit information therebetween.

When the caller places a directed-dialog call via the Communication Device 102, the call is routed via a switch (not explicitly shown) in the PSTN 104 to the DDPS 122. The call is handled by the DDP 106. The directed-dialog call may be, for example, a call made to determine a specific wireline or wireless telephone number and address of a residence or business. In various embodiments, the directed-dialog call may come from, for example, a wireline telephone, a wireless telephone, a smartphone telephone, a VOIP telephone, a satellite telephone, a PC, or the like. For example, the caller may place the directed-dialog call by dialing a specific phone number via the Communication Device 102 such as, for example, 1-800-CALLERS. The DDP 106 is operable to prompt the caller, via the PSTN 104 and the Communication Device 102, for a verbal response. For example, the DDP 106 may use a pre-recorded prompt such as "What is your name?" to prompt the caller for their name. When the caller utters a verbal response to the pre-recorded prompt, a caller response is created by the Communication Device 102.

As used herein, context information is information used to guide recognition of the caller response. The DDP 106 receives the caller response via the Communication Device 102 and the PSTN 104 and typically gathers context information about the directed-dialog call from the Communication Device 102 and/or the PSTN 104 via various methods.

For example, the caller's phone number may be obtained by the DDP 106 from the PSTN 104 and used to provide city context information through an area code and the directed-dialog application flow of the DDP 106 could be used to provide either business name context information or a type of restaurant. The DDPS 122 forwards the caller response via the Network 108 to the MRPS 120, thereby forming a forwarded caller response. In a typical embodiment, the context information and the forwarded caller response are received by the MRP 110 via the Network 108 from the DDP 106. The caller response and the forwarded caller response may each be, for example, a digital or analog representation of the caller response to the pre-recorded prompt by the DDP 106. In some embodiments, the caller response may be processed in some manner by the DDP 106 prior to forwarding to the MRPS 110.

In a typical embodiment, at least a portion of the context information is obtained by the DDP 106 via verbal prompts provided to the caller. For example, the DDP 106 typically forwards to the caller via the Communication Device 102 a pre-recorded prompt such as, "For what city please?" Once a city name is uttered by the caller in response to the pre-recorded prompt, context information applicable to a caller being asked for a city name may be obtained by the DDP 106. Depending upon where the caller is within the directed-dialog application flow, context information may also be varied for each interaction between the caller and the DDP 106. For example, after the DDP 106 forwards to the caller the pre-recorded prompt, "For what city please?," there typically is a further pre-recorded prompt as defined by the directed-dialog application flow, such as, "For what restaurant name?" Context information for a caller being asked for a city name may be different from context information for a caller being asked for a restaurant name. In a typical embodiment, the context information may also be obtained from other systems, databases, or networks connected to the system 100.

The Context Database 112 is connected to the MRP 110 via the Network 108. The Context Database 112 typically includes additional context information relevant to context information forwarded by the DDP 106. In various embodiments, the Context Database 112 may be implemented using, for example, Oracle™, MS Access™ databases, MS SQL, IBM DB2, or a simple text file. In a typical embodiment, the Context Database 112 is implemented on a computer such as, for example, the computer system 400 shown in FIG. 4 or the like. In a typical embodiment, the Context Database 112 may be connected to other systems, databases, or networks to receive and transmit additional context information therebetween.

In a typical embodiment, the DDP 106 may designate a subset of the context information as personalization context information and add the personalization context information to a Personalization Database 113. Personalization context information may be linked to a phone number, Internet Protocol (IP) address, International Mobile Equipment Identity (IEMI) number, physical mailing address, geographic location and the like. For example, the DDP 106 may take from the context information a language (e.g., English, Spanish, etc.) chosen by the caller calling from a mobile device with a specific IMEI number and add it to the Personalization Database 113 as part of records associated with the mobile device. The language information may be retrieved from the Personalization Database by the DDP 106 and passed to the MRPS 120 as context information responsive to the same caller making a subsequent call to the system 100 using the mobile device with the specific IMEI number. In various embodiments, the personalization context information stored in the Personalization Database 113 may also be retrieved by the MRP 110 in response to context information having been passed to the MRP 110 by the DDP 106. In a typical embodiment, the Personalization Database 113 may also be connected to other systems, databases, or networks to receive and transmit personalization context information therebetween.

Each of the SREs 114, 116 is typically arranged to operate simultaneously in parallel. Typically, each of the SREs 114, 116 has a different speech-recognition capability such as, for example, context-dependent recognition, context-independent recognition, and out-of-vocabulary recognition. For example, context-dependent recognition requires a response via the Communication Device 102 in response to a pre-recorded prompt from the DDP 106. For example, if the pre-recorded prompt from the DDP 106 is "I recognized the city spoken as Dallas, Tex. Is that correct? Please state YES or NO." The response "YES" or "NO" from the caller represents contextual information used for context-dependent recognition if one or more of the SREs 114, 116 is expecting either a YES or NO as an expected response.

A context-independent recognition engine is operable to understand the a caller response when the caller response is relevant but not as expected but relevant. For example, a context-independent recognition engine may recognize "correct" as synonymous for "YES" for the request, "I recognized the city as Dallas, Tex. Is that correct? Please state YES or NO."

An out-of-vocabulary speech-recognition engine is operable to understand unexpected caller responses that are not relevant to the questions being asked. For example, words like "please", "thank you", "wait a minute", and caller hesitations like "ah", "um", and "err" are considered to be out-of-vocabulary. In a typical embodiment, the MRP 110 is operable to select a set of SREs of the SREs 114, 116 in order to optimize speech-recognition processing of the forwarded caller response depending on the context information received from the DDP 106. In various embodiments, each SRE of the SREs 114, 116 may be operable to perform one or more of context-dependent recognition, context-independent recognition, and out-of-vocabulary speech-recognition.

As used herein, a grammar is a list of words and phrases that can be recognized by an SRE. A grammar is accessible by an SRE and may be stored in, for example, a flat file, spreadsheet, database, object-oriented data structure, or the like. As used herein, a static grammar is a grammar that is defined prior to a speech-recognition request. For example, a static grammar for a city-name recognition may recognize only pre-defined words such as, for example, "Dallas", "Arlington", and "McKinney." Similarly, a static grammar for restaurant-name recognition may recognize only pre-defined words such as, for example, "McSlappys", "Burger Sling", and "Pizza Place." Typically, each SRE of the SREs 114, 116 recognizes only a single grammar. In various embodiments, each SRE may recognize multiple grammars.

In a typical embodiment, configuration files accessible to the MRP 110 specify at least availability of, speech-recognition capabilities of, and predefined weight values associated with each SRE of the SREs 114, 116 designed to produce optimal speech-recognition performance. The predefined weight values are typically associated with the types of grammar recognizable by each SRE of the SREs 114, 116. In various embodiments, however, the predefined weight values may be further associated with the speech-recognition capabilities or other attributes specific to each SRE. In a typical embodiment, the MRP 110 uses at least the context information received from the DDP 106 and both the speech-recognition capabilities and the predefined weight values of each SRE as defined by the MRP 110 configuration files to select at least one SRE of the SREs 114, 116 to be used to recognize the forwarded caller response.

The SRE selection may also be enhanced by additional information included in the Context Database 112 to create modified context information. For example, if the context information passed from the DDP 106 to the MRP 110 is "find a restaurant near the caller's location," the caller's phone number could be used to query the Context Database 112 for the caller's city name. The caller's city name could then be added to the context information to create the modified context information and used to select SREs that have appropriate static restaurant grammars for recognizing restaurant names in or near the caller's city. The MRP 110 requests, via the Network 108, speech recognition of the forwarded caller response by, for example, passing the forwarded caller response, context information or modified context information, and a request for speech recognition of the forwarded caller response to each selected SRE of the SREs 114, 116.

Each selected SRE of the SREs 114, 116 is operable to recognize the forwarded caller response and return the results to the MRP 110. As used herein, a confidence-score value is a probability measure from a particular SRE that a speech-recognition result matches a forwarded caller response. The higher a confidence-score value, the more likely the particular speech-recognition result is correct. As used herein, a word-score value is a probability measure from a particular SRE that a returned word within a phrase matches a word in the forwarded caller response. The higher the word-score value, the more likely the particular result is correct. The MRP 110 receives from each selected SRE a set phrases and/or words as an n-best hypotheses of what the caller said with both confidence-score values and word-score values for each phrase and individual word in each phrase, respectively, as an n-best list. In a typical embodiment, the phrases and/or words in the returned n-best list are arranged with a phrase and/or word with the highest confidence-score value placed highest and a phrase and/or word with the lowest confidence-score value placed lowest.

In a typical embodiment, the MRP 110 is operable to modify both confidence-score values and word-score values in each received n-best list using the speech-recognition capabilities and the predefined weight values associated with the returned n-best list's SRE. For example, one SRE of the SREs 114, 116 selected by the MRP 110 could have an associated predefined weight value of 1.0, while another selected SRE could have an associated predefined weight value of 2.0. The confidence-score values and word-list values in the returned n-best list associated with the SRE with a predefined weight value of 2.0 could be multiplied by 2.0.

Typically, the n-best lists received from each selected SRE of the SREs 114, 116 are combined into a single combined n-best list by the DDP 106. The combined n-best list comprises a list of phrases and/or words arranged with a phrase and/or word with the highest confidence-score value placed highest and a phrase and/or word with the lowest confidence-score value placed lowest.

The Context Database 112 may also be utilized to further to modify confidence-score values and word-score values for recognized phrases and/or words, remove unrecognized phrases and/or words, and add phrases and/or words to the combined n-best list. Each recognition result of the combined n-best list may be used to search the Context Database 112. The confidence-score values and word-score values may then be modified based on the occurrence of the phrases and/or words in the Context Database 112 to create a modified combined n-best list. The modified combined n-best list may then be sorted to form a newly-combined n-best list. Use of the Context Database 112 to modify confidence-score values and word-score values for recognized phrases and/or words, remove unrecognized phrases and/or words, add phrases and/or words to the combined n-best list, and to form the newly-combined n-best list may not be implemented in some embodiments.

A predefined threshold-confidence-score value is a single value that defines the confidence required for the DDP 106 to accept a result from a combined n-best list or a newly-combined n-best list. The MRP 110 is used to determine whether a confidence-score value of at least one entry in the combined n-best list or the newly-combined n-best list exceeds a predefined threshold-confidence-score value. The value of variable, an acceptance status indicator, is set to indicate the result of the determination. If the result indicates that the confidence-score value of at least one entry in the combined n-best list or newly-combined n-best list exceeds the predefined threshold-confidence-score value, the combined n-best list or the newly-combined n-best list and confidence-score values and word-score values and the acceptance status indicator are returned to the DDP 106 by the MRP 110.

As used herein, a dynamic grammar is a grammar that is created by the MRP 110 from a combination of recognized phrases and/or words from results returned by the SREs and optionally from context information provided by the DDP 106 and results from a search of the Context Database 112. For example, assume a specific context of "find a restaurant name in Dallas, Tex." context. If the returned words from the SREs are "Pizza, Restaurant, Place, Pita" and the database search using these words in Dallas, Tex., return "Pizza, Italian, Pasta, Place, Downtown, Location," a dynamic grammar may be created from the combined words, "Pizza, Restaurant, Place, Pita, Italian, Pasta, Downtown, Location" and this dynamically-created grammar may be used to re-recognize an unmodified forwarded caller response. The newly-generated dynamic grammar is considered dynamic because the grammar is not known prior to the original caller prompt by the DDP 106 and is dependent on the caller response and context information. In a typical embodiment, the newly-generated dynamic grammar uses all the words from the original SRE recognition results, any additional words found in the Context Database 112, and other common words. If the result indicates that the confidence-score value of at least one entry in the combined n-best list or the newly-combined n-best list does not exceed the predefined-threshold-confidence-score value, the MRP 110 returns: 1) the combined n-best list or the newly-combined n-best list and 2) the acceptance status indicator to the DDP 106. In another option, responsive to the result indicating that the confidence-score value of at least one entry in the combined n-best list or newly-combined n-best list does not exceed the predefined-threshold-confidence-score value, the MRP 110 generates a dynamic grammar in order to perform a new speech recognition on the forwarded caller response.

Figure 2A:
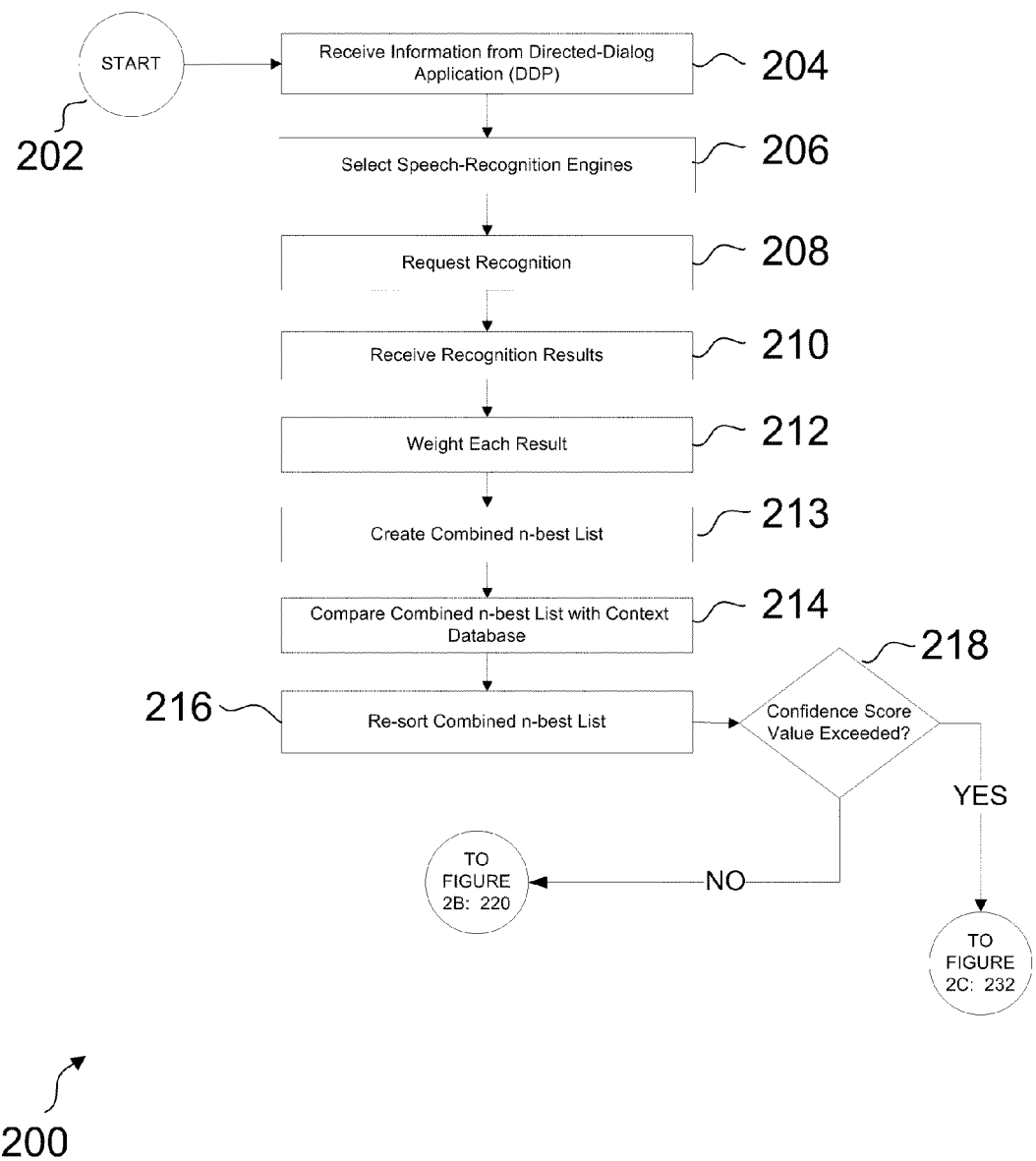
FIGS. 2A-C are flow charts that illustrate a speech-recognition process.
Figure 2B:
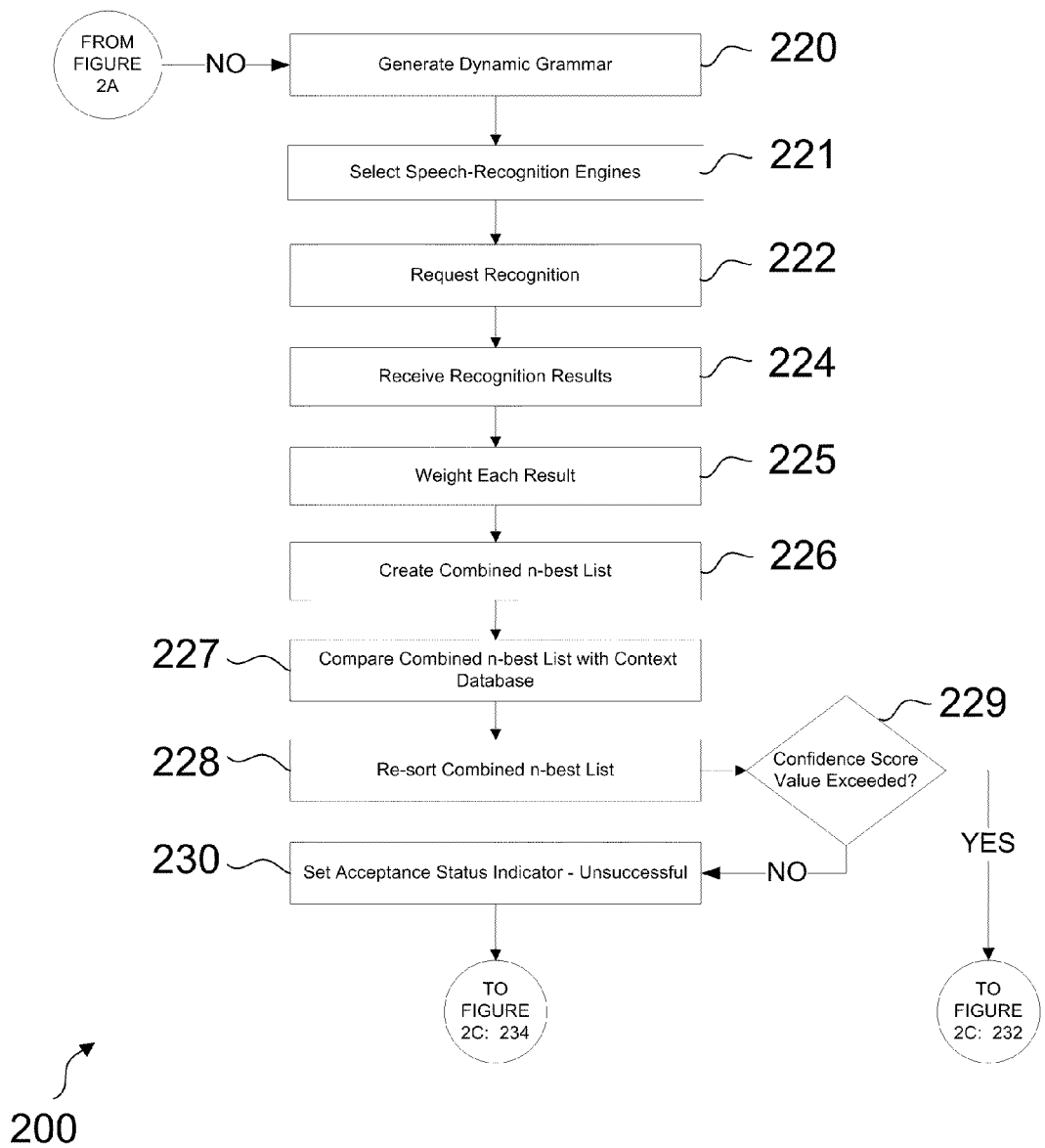
Figure 2C:
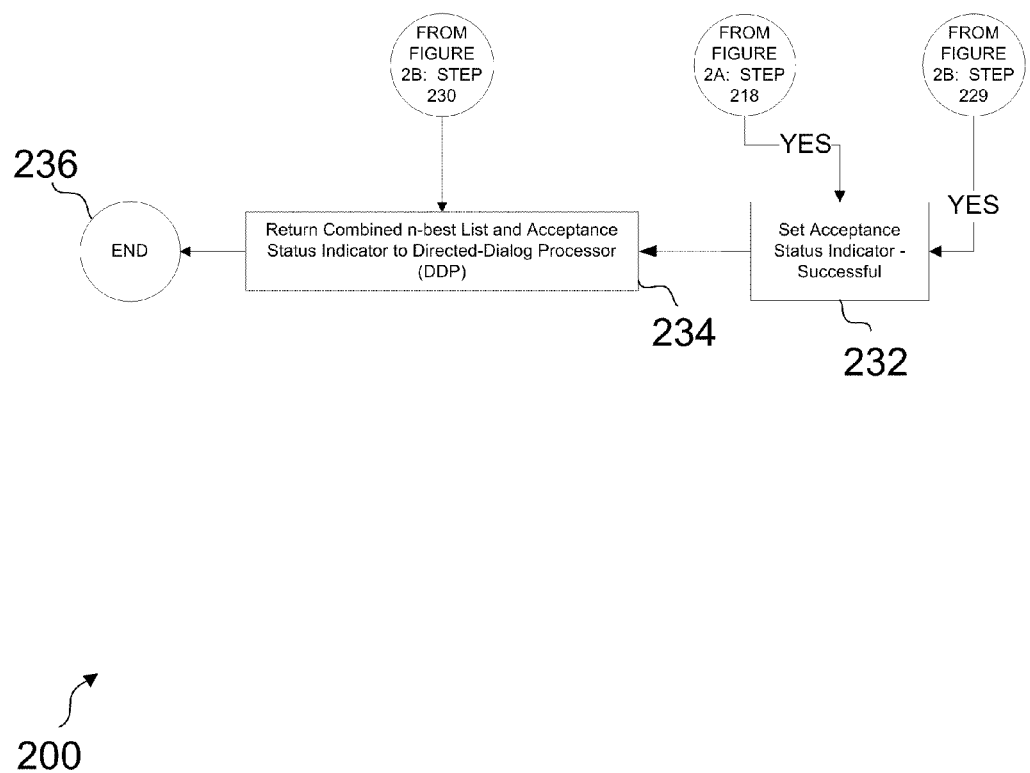

FIGS. 2A-C illustrate a flow 200 of a speech-recognition method. The flow 200 starts at STEP 202. At STEP 204, context information and a forwarded caller response are received by the MRP 110 from the DDP 106.

As described above with respect to FIG. 1, the context information received from the DDP 106 may include, for example, a caller name and address, a caller phone number, a caller location, a caller's preferred language, billing information, a type of directory assistance required, last call details, and other pertinent information related to the directed-dialog call or the caller. The context information may additionally include information such as, for example, a network carrier, a service provider, a service requirement, required return information, a location referenced by the directed-dialog, and the like. In a typical embodiment, context information is passed from the DDP 106 to the MRP 110 concurrently with the forwarded caller response. In various embodiments, however, context information may also be passed from the DDP 106 to the MRP 110 separately from the forwarded caller response. From STEP 204, the flow 200 proceeds to STEP 206.

At STEP 206, the MRP 110 uses the context information received from the DDP 106 and the configuration files accessible to the MRP 110 to select which SREs of the SREs 114, 116 should be used to perform speech recognition on the forwarded caller response. From STEP 206, the flow 200 proceeds to STEP 208.

At STEP 208, the MRP 110 requests speech recognition of the forwarded caller response by passing, via the Network 108, the forwarded caller response, the context information or the modified context information, and the speech-recognition request for the forwarded caller response to each selected SRE. Each selected SRE recognizes the forwarded caller response and returns the results to the MRP 110. From STEP 208, the flow 200 proceeds to STEP 210.

At STEP 210, each selected SRE returns to the MRP 110 an n-best list with both confidence-score values and word-score values for each phrase and for individual words in each phrase, respectively. For example, a returned n-best list may be structured as illustrated in Table 1:

TABLE 1

| Confidence | Phrase | Score | Score | Score | Score | Score | Score |
|---|---|---|---|---|---|---|---|
| 0.791 | Buymart store on Main Street | Buymart 0.765 | Store 0.673 | on 0.452 | Main 0.562 | Street 0.123 | N/A |
| 0.734 | Buy mart store on Main Street | Buy 0.563 | mart 0.635 | store 0.673 | on 0.452 | Main 0.562 | Street 0.123 |
| 0.682 | Buy marts store in Main Street | Buy 0.563 | marts 0.523 | store 0.673 | in 0.256 | Main 0.562 | Street 0.123 |

For the phrase "Buymart store on Main Street", the n-best list returns a confidence-score value of 0.791 that this phrase matches the forwarded caller response. A word-score value of 0.765 for the word "Buymart" indicates a confidence of the SRE that this word matches a word in the forwarded caller response. It is possible to have a high confidence-score value for a phrase but one or more low word-score value for individual words that make up the phrase. Even though one word may result in a low word-score value, high word-score values on other words may result in an overall high confidence-score value for the phrase. As illustrated in Table 2, it is also possible that the returned n-best list is comprised of only words:

TABLE 2

| Confidence | Phrase | Score |
|---|---|---|
| 0.892 | Yes | Yes 0.892 |
| 0.632 | Yeah | Yeah 0.632 |
| 0.345 | Yup | Yup 0.345 |

In this case, the word-score values equal the confidence-score values. For example, for the word "Yes", both the confidence-score value and the word-score value equal 0.892. From STEP 210, the flow 200 proceeds to STEP 212.

At STEP 212, the MRP 110 processes the received n-best list from each selected SRE of the SREs 114, 116. Confidence-score values and word-score values in each received n-best list may be modified based on context information provided by the DDP 106 and a predefined weight value associated with the applicable SRE. For example, assume that a specific context of "find a restaurant" is received in the context information from the DDP 106 and that two types of static grammar are available, each in a separate SRE: 1) "the names of restaurant chains within large cities"; and 2) "specific restaurant names within each city." In a typical embodiment, names of restaurant chains are less likely to be found in small cities and are more likely to be found in large cities. In this case, a weight-multiplier value modifying the returned confidence-score values and word-score values in each returned n-best list can be established based on city size. A size or number of businesses in a city may be obtained, for example, from the Context Database 112.

If the DDP 106 provides a specific context of "large city" in the context information, the confidence-score values and word-score values of the n-best list resulting from the restaurant-chain static grammar may be increased. If the city is small, the confidence-score values and word-score values of the n-best list resulting from the static "specific restaurant names within each city" specific grammar may be increased. For example, an SRE may return "Pizza Place" with a confidence-score value of 0.5 from the "the names of restaurant chains within large cities" and another SRE may return "Pizza Mikes" with a confidence-score value of 0.5 from the static "specific restaurant names within each city" grammar. If the city is a large city, the confidence-score values and word-score values of "Pizza Place" could be increased. However, if the city is a small city, then all the confidence-score values and word-score values of "Pizza Mikes" could be increased.

In this case, a city name from the context information received from the DDP 106 is what is being used with information from the Context Database 112 in order to determine city size and the weight multipliers to use to modify appropriate confidence-score values and word-score values. In a typical embodiment, after weighting adjustments are made to the confidence-score values and word-score values, each of the n-best lists is re-sorted from highest confidence-score values and word-score values to the lowest confidence-score values and word-score values. From STEP 212, the flow 200 proceeds to STEP 213.

At STEP 213, the re-sorted n-best lists are combined into a single combined n-best list. The combined n-best list contains phrases and/or words with the highest confidence-score values and word-score values first, followed by the next highest confidence-score values and word-score values, and down to the lowest confidence-score values and word-score values. From STEP 213, the flow 200 proceeds to STEP 214.

At STEP 214, the MRP 110 compares the combined n-best list phrases and/or words against the Context Database 112. The MRP 110 may modify the confidence-score values and word-score values in the combined n-best list based on the occurrence of the phrases and/or words within the Context Database 112. The MRP 110 may also remove unrecognized phrases and/or words, or add phrases and/or words to the combined n-best list as described above.

For example, if the phrase "Burger Sling Beef Palace" was returned by an SRE and this phrase exactly matches a restaurant in the Context Database 112, the confidence-score values may be increased for that phrase in the combined n-best list. If the phrase "Burger Sling" is returned by an SRE and this matches two of four words for a restaurant in the Context Database 112, the confidence-score values may be increased for that result in the combined n-best list, but not by as much as a result with all four words would have its confidence-score value increased.

If an SRE returns an n-best list with phrases and/or words with no exact match within the Context Database 112, phrases and/or words pre-programmed into the Context Database 112 can be added to the n-best list. For example, if an SRE returned "Burger Sling" and the Context Database 112 had the phrase "Burger Sling Beef Palace," the words "Beef" and "Palace" may be added to the n-best list phrase so that the phrase becomes "Burger Sling Beef Palace." As a further example, if a street name was recognized and the combined n-best list phrase is "twenty-third avenue" but the Context Database 112 only has the phrase "twenty-third street," the word "avenue" could be removed from the combined n-best list phrase. If each of the combined n-best list phrases has words repeated that are in the Context Database 112, the word-score value of the repeated words may be increased by a pre-defined weighting value. From STEP 214, the flow 200 proceeds to STEP 216.

At STEP 216, the combined n-best list and confidence-score values and word-score values are re-sorted as a newly-combined n-best list. From STEP 216, the flow 200 proceeds to STEP 218.

At STEP 218, a determination is made whether the confidence-score value of at least one entry in the newly-combined n-best list exceeds a predefined threshold-confidence-score value necessary to accept a result from the newly-combined n-best list. For example, if a partial n-best list is populated as illustrated in Table 3,

TABLE 3

| Confidence | Phrase |
|---|---|
| 0.898 | Phrase one |
| 0.699 | Phrase two |
| 0.563 | Phrase three |
| 0.441 | Phrase four | a predefined confidence-threshold-score value of 0.700 would mean that "Phrase one" is accepted, and that the other phrases are not accepted. A phrase in an n-best list may be comprised of a single word or multiple words (e.g. "Burger" "Burger Sling", "Burger Sling Beef Palace"); however, it is the confidence-score value of the phrase that is compared to the predefined threshold-confidence-score value and not the word-score value. There can be different thresholds for each specific context in the context information provided by the DDP 106. For example, a specific context of "business name in a city" could have a predefined threshold-confidence-score value of 0.600, while a specific context of "yes/no question" could have a predefined threshold-confidence-score value of 0.900. If the confidence-score value exceeds the predefined threshold-confidence-score value, the flow 200 proceeds to STEP 232 (FIG. 2C).

At STEP 232, an acceptance status indicator is set to a value indicating a successful predefined threshold-confidence-score value comparison result. In a typical embodiment, a "successful" acceptance status indicator value informs the DDP 106 to accept the highest confidence-score-value entry from the newly-combined n-best list. From STEP 232, the flow proceeds to STEP 234.

At STEP 234, the newly-combined n-best list with confidence-score values and word-score values and the acceptance status indicator are returned to the DDP 106 by the MRP 110. At STEP 236, the flow 200 ends and the DDP 106 may progress to a next appropriate step in the directed-dialog application flow with the caller.

If it is determined at STEP 218 that the confidence-score value does not exceed the predefined threshold-confidence-score value, the flow 200 proceeds to STEP 220 of FIG. 2B. Turning now to FIG. 2B, at STEP 220, a dynamic grammar is created by the MRP 110 from a combination of recognized phrases and/or words from returned SRE results and optionally from context information provided by the DDP 106 and results from a search of the Context Database 112. From STEP 220, the flow 200 proceeds to STEP 221.

In similar fashion to STEP 206, at STEP 221, the MRP 110 uses the context information received from the DDP 106 and the configuration files accessible to the MRP 110 to select which SREs of the SREs 114, 116 should be used to perform speech recognition on the forwarded caller response. From STEP 221, the flow 200 proceeds to STEP 222.

In similar fashion to STEP 208, at STEP 222, the MRP 110 requests a speech recognition of the forwarded caller response by passing, via the Network 108, the forwarded caller response, modified context information, and a request for speech recognition of the forwarded caller response to each selected SRE of the SREs 114, 116. The modified context information is the dynamic grammar generated in STEP 220. Each selected SRE recognizes the forwarded caller response and returns the results to the MRP 110. From STEP 222, the flow 200 proceeds to STEP 224.

In similar fashion to STEP 210, at STEP 224, each selected SRE returns to the MRP 110 an n-best list. From STEP 224, the flow 200 proceeds to STEP 225.

In similar fashion to STEP 212, at STEP 225, confidence-score values and word-score values for each returned n-best list may be modified based on context information provided by the DDP 106 and a predefined weight value associated with the applicable SRE. Each of the n-best lists is re-sorted from highest confidence-score values and word-score values to the lowest confidence-score values and word-score values. From STEP 225, the flow 200 proceeds to STEP 226.

In similar fashion to STEP 213, at STEP 226, the re-sorted n-best lists are combined into a single combined n-best list. The combined n-best list contains phrases and/or words with the highest confidence-score values and word-score values first, followed by the next highest confidence-score values and word-score values, and down to the lowest confidence-score values and word-score values. From STEP 226, the flow 200 proceeds to STEP 227.

In similar fashion to STEP 214, at STEP 227, the MRP 110 may further reduce or add weight to confidence-score values and word-score values for recognized words, remove unrecognized words, or add words to the combined n-best list as described above. The combined n-best list phrases and words are used to search the Context Database 112 and the confidence-score values and word-score values may be modified based on the occurrence of the phrases and words within the Context Database 112 as described above. From STEP 227, the flow 200 proceeds to STEP 228.

At STEP 228, the combined n-best list and confidence-score values and word-score values are re-sorted as a newly-combined n-best list following the use of the Context Database 112 to further modify the combined n-best list. From STEP 228, the flow 200 proceeds to STEP 229.

If it is determined at STEP 229 that the confidence-score value of at least one entry in the newly-combined n-best list exceeds the predefined threshold-confidence-score value, the flow 200 proceeds to STEP 232 as described in FIG. 2C. Turning now to FIG. 2C, at STEP 232, the acceptance status indicator is set to a value indicating a successful predefined threshold-confidence-score value comparison result in order to inform the DDP 106 to accept the highest confidence-score-value entry from the newly-combined n-best list. From STEP 232, the flow 200 proceeds to STEP 234.

However, if it is determined at STEP 229 that the confidence-score value of at least one entry in the combined n-best list does not exceed the predefined-threshold-confidence-score value, the flow 200 proceeds to STEP 230. At STEP 230, as described in FIG. 2B, the acceptance status indicator is set to a value indicating an unsuccessful predefined threshold-confidence-score value comparison result in order to inform the DDP 106 to not accept the highest confidence-score-value entry from the newly-combined n-best list. From STEP 230, the flow 200 proceeds to STEP 234.

Figure 3:
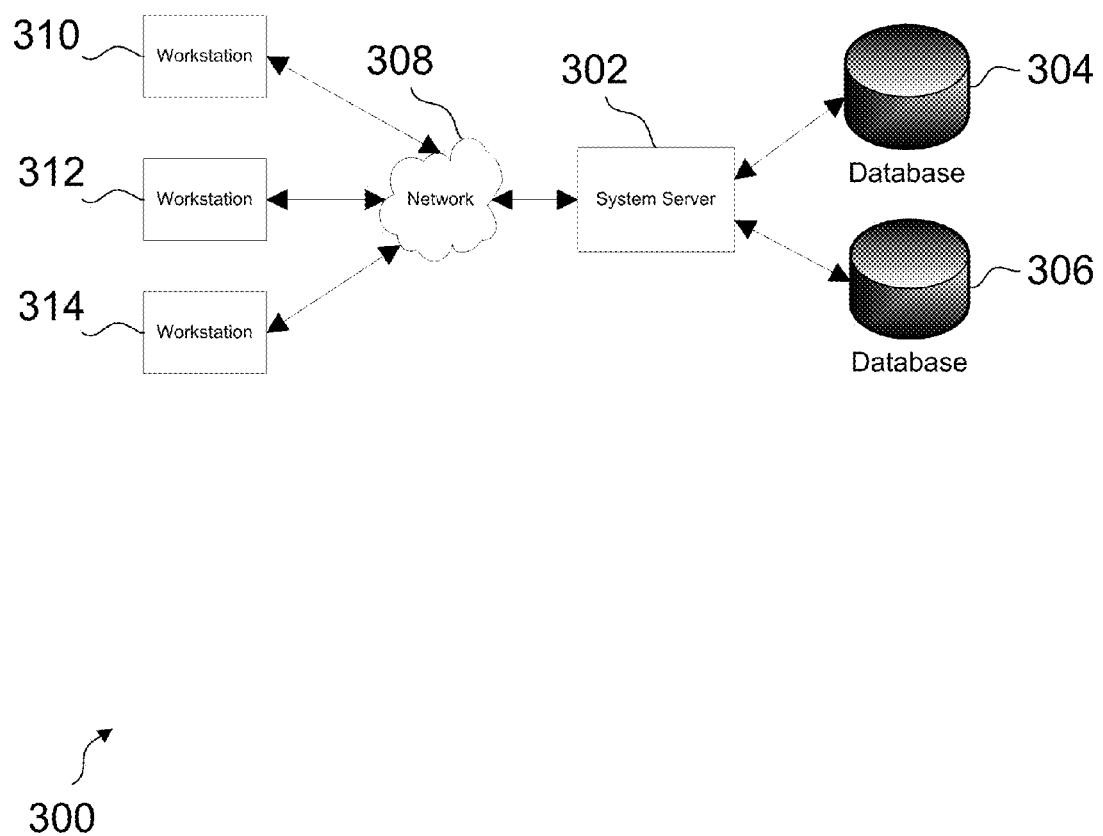
FIG. 3 is a block diagram that illustrates a system capable of implementing various embodiments of the present invention.
Figure 4:
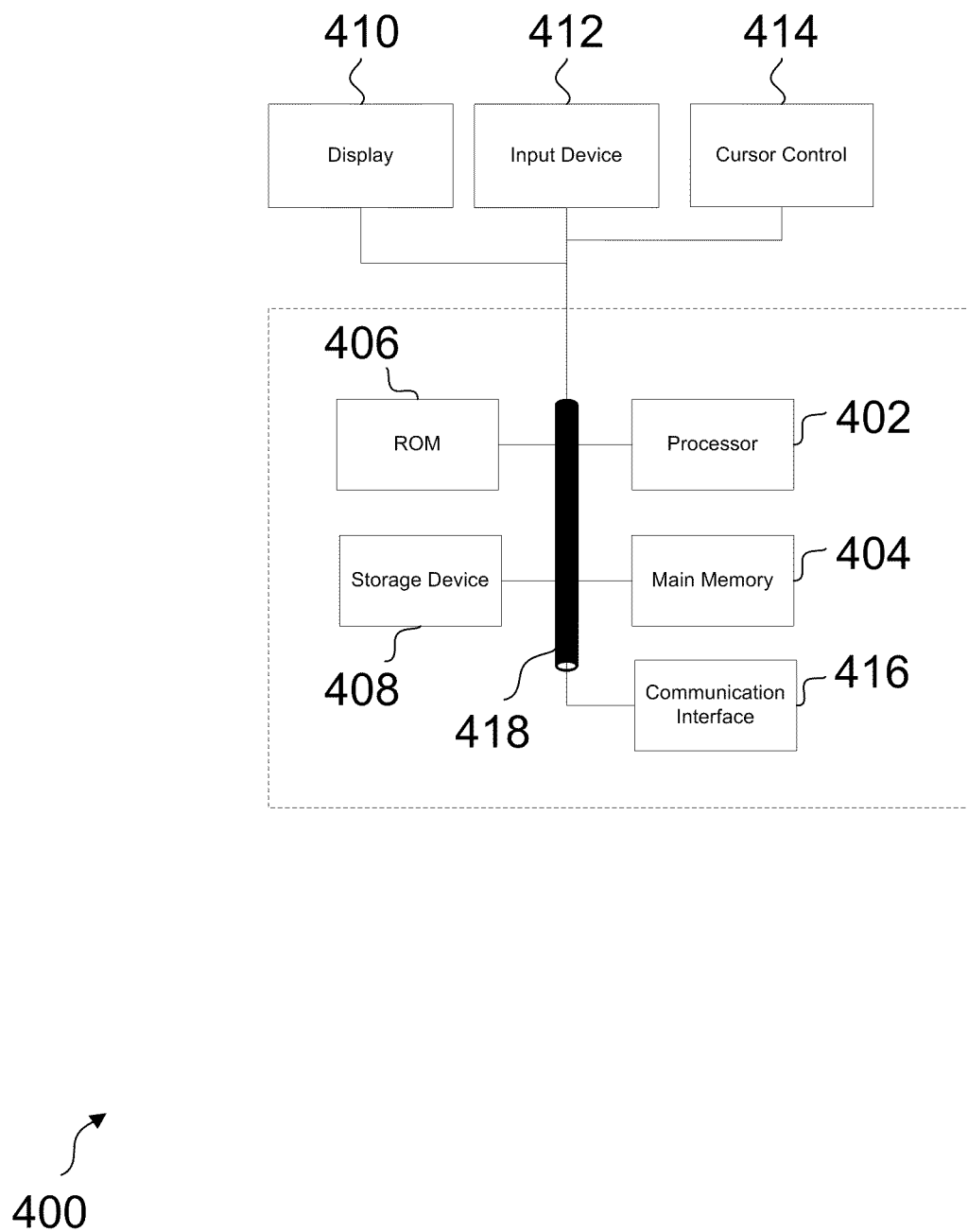
FIG. 4 is a block diagram illustrating a computer system.

FIG. 3 is a block diagram of a system 300 capable of implementing various embodiments of the invention. The system 300 includes a system server 302 connected to a plurality of databases 304, 306. In a typical embodiment, the system server 302 and the databases 304, 306 may be implemented on a computer such as, for example, the computer system 400 as shown in FIG. 4 and the like. The system server 302 is also connected via a network 308 to a plurality of workstations 310, 312, 314. In a typical embodiment, the plurality of workstations 310, 312, 314 may be implemented on a computer such as, for example, the computer system 400 as illustrated in FIG. 4 and the like. The network 308 may be the Internet, an intranet, a wireless network, and the like. The system 300 is simply one example of a system that may be used to implement various embodiments of the invention. Those skilled in the art will appreciate that, although only two databases, a single server, and three workstations are illustrated as part of the system 300, a varying number of each may be employed in a computer system implementing various embodiments of the invention without departing from principles of the invention.

FIG. 4 illustrates an embodiment of a computer system 400 on which various embodiments of the invention may be implemented, including the SRES 118, the DDPS 122, the SRPS 120, the Context Database 112, the Personalization Database 113, and the Communication Device 102. The computer system 400 may be a physical system, virtual system, or a combination of both physical and virtual systems. In the implementation, a computer system 400 may include a bus 418 or other communication mechanism for communicating information and a processor 402 coupled to the bus 418 for processing information. The computer system 400 also includes a main memory 404, such as random-access memory (RAM) or other dynamic storage device, coupled to the bus 418 for storing computer readable instructions by the processor 402.

The main memory 404 also may be used for storing temporary variables or other intermediate information during execution of the instructions to be executed by the processor 402. The computer system 400 further includes a read-only memory (ROM) 406 or other static storage device coupled to the bus 418 for storing static information and instructions for the processor 402. A computer-readable storage device 408, such as a magnetic disk or optical disk, is coupled to the bus 418 for storing information and instructions for the processor 402. The computer system 400 may be coupled via the bus 418 to a display 410, such as a liquid crystal display (LCD) or a cathode ray tube (CRT), for displaying information to a user. An input device 412, including, for example, alphanumeric and other keys, is coupled to the bus 418 for communicating information and command selections to the processor 402. Another type of user input device is a cursor control 414, such as a mouse, a trackball, or cursor direction keys for communicating direct information and command selections to the processor 402 and for controlling cursor movement on the display 410. The cursor control 414 typically has two degrees of freedom in two axes, a first axis (e.g., x) and a second axis (e.g., y), that allow the device to specify positions in a plane.

The term "computer readable instructions" as used above refers to any instructions that may be performed by the processor 402 and/or other component of the computer system 400. Similarly, the term "computer readable medium" refers to any storage medium that may be used to store the computer readable instructions. Such a medium may take many forms, including, but not limited to, non volatile media, volatile media, and transmission media. Non-volatile media include, for example, optical or magnetic disks, such as the storage device 408. Volatile media includes dynamic memory, such as the main memory 404. Transmission media includes coaxial cables, copper wire, and fiber optics, including wires of the bus 418. Transmission media can also take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 402 for execution. For example, the instructions may initially be borne on a magnetic disk of a remote computer. The remote computer can load the instructions into its dynamic memory and send the instructions over a telephone line using a modem. A modem local to the computer system 400 can receive the data on the telephone line and use an infrared transmitter to convert the data to an infrared signal. An infrared detector coupled to the bus 418 can receive the data carried in the infrared signal and place the data on the bus 418. The bus 418 carries the data to the main memory 404, from which the processor 402 retrieves and executes the instructions. The instructions received by the main memory 404 may optionally be stored on the storage device 408 either before or after execution by the processor 402.

The computer system 400 may also include a communication interface 416 coupled to the bus 418. The communication interface 416 provides a two-way data communication coupling between the computer system 400 and a network, such as Network 108 of FIG. 1. For example, the communication interface 416 may be an integrated services digital network (ISDN) card or a modem used to provide a data communication connection to a corresponding type of telephone line. As another example, the communication interface 416 may be a local area network (LAN) card used to provide a data communication connection to a compatible LAN. Wireless links may also be implemented. In any such implementation, the Communication Interface 416 sends and receives electrical, electromagnetic, optical, or other signals that carry digital data streams representing various types of information. The storage device 408 can further include instructions for carrying out various processes for image processing as described herein when executed by the processor 402. The storage device 408 can further include a database for storing data relative to same.

Although various embodiments of the system and method of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A system comprising:
a directed-dialog-processor server having a directed-dialog-processor application executing thereon;
a speech-recognition-engine server having a plurality of parallel-operable speech-recognition-engine applications executing thereon;
wherein the plurality of parallel-operable speech-recognition-engine applications each provide a different speech-recognition capability;
a context database;
a multiple-recognition-processor server in data communication with the directed-dialog-processor server, the speech-recognition-engine server, and the context database and having a multiple-recognition-processor application executing thereon; and
wherein the multiple-recognition-processor server is operable, via the multiple-recognition-processor application, to:
receive context information and a forwarded caller response from the directed-dialog-processor application;
select, using the context information, a set of parallel-operable speech-recognition-engine applications from the plurality of parallel-operable speech-recognition-engine applications;
combine the context information with additional context information from the context database to form modified context information;
forward to each speech-recognition-engine application in the selected set the modified context information, the forwarded caller response, and a request to perform speech recognition of the forwarded caller response;
receive from each speech-recognition-engine application in the selected set an n-best list comprising at least one confidence-score value and at least one word-score value;
wherein the at least one confidence-score value and the at least one word-score value in each n-best list are modified by a weight-multiplier value based on the context information provided by the directed-dialog-processor application, thereby creating a modified n-best list;
wherein each modified n-best list is combined into a single, sorted combined n-best list; and
wherein the at least one confidence-score value and the at least one word-score value of the sorted combined n-best list are modified by determining presence of phrases and words of the sorted combined n-best list in the context database.

2. The system of claim 1, wherein the sorted combined n-best list is re-sorted following modification of the at least one confidence-score value and the at least one word-score value.

3. The system of claim 2, wherein, responsive to a determination that a confidence-score value of the at least one confidence-score value in the sorted combined n-best list exceeds a predefined threshold confidence-score value, the multiple-recognition-processor server sets an acceptable status indicator to a value instructing the directed-dialog-processor server to accept the entry in the n-best list with the highest confidence-score value and forwards to the directed-dialog-processor the n-best list and the acceptance status indicator.

4. The system of claim 1, wherein, responsive to a determination that a confidence-score value of the at least one confidence-score value in the sorted combined n-best list does not exceed a predefined threshold confidence-score value, the multiple-recognition-processor server generates a dynamic grammar.

5. The system of claim 4, wherein:
the multiple-recognition-processor server forwards, to each selected speech-recognition-engine application, the modified context information, the forwarded caller response, and a request to perform a speech-recognition of the forwarded caller response; and
the modified context information comprises the dynamic grammar.

6. The system of claim 1, wherein the selection of the set of parallel-operable speech-recognition-engine applications from the plurality of speech-recognition-engine applications comprises analyzing configuration files in data communication with the multiple-recognition-processor server.

7. A method comprising:
(a) providing a processor;
(b) providing a memory interoperably coupled to the processor and having computer-readable processor instructions stored thereon;
(c) using the processor and the memory in combination with the computer-readable processor instructions to perform at least one of steps (d)-(i);
(d) receiving context information and a forwarded caller response from a directed-dialog-processor application executing on a directed-dialog-processor server;
(e) selecting, using the context information, a set of parallel-operable speech-recognition-engine applications from a plurality of parallel-operable speech-recognition-engine applications executing on a speech-recognition-engine server;
wherein the plurality of parallel-operable speech-recognition-engine applications each provide a different speech-recognition capability;
(f) combining the context information received in step (d) and additional context information present in a context database, thereby forming modified context information;
(g) forwarding modified context information, the forwarded caller response, and a request to perform speech recognition of the forwarded caller response to each speech-recognition-engine application selected in step (e);
(h) receiving from each speech-recognition-engine application of the set of parallel-operable speech-recognition-engine applications an n-best list comprising at least one confidence-score value and at least one word-score value;
(i) responsive to step (h), modifying the at least one confidence-score value and the at least one word-score value in each n-best list by a weight-multiplier value based on the context information provided by the directed-dialog-processor application, thereby creating a modified n-best list;
wherein each modified n-best list is combined into a single sorted combined n-best list; and
wherein the at least one confidence-score value and the at least one word-score value of the sorted combined n-best list are modified by determining presence of phrases and words of the sorted combined n-best list in the context database.

8. The method of claim 7, comprising:
responsive to the modification of the at least one confidence-score value and the at least one word-score value, re-sorting the sorted combined n-best list.

9. The method of claim 8, comprising:
responsive to a determination that a confidence-score value of the at least one confidence-score value in the sorted combined n-best list exceeds a predefined threshold-confidence-score value, setting the value of an acceptable status indicator to a value instructing the directed-dialog-processor server to accept the entry in the n-best list with the highest confidence-score value and forwarding to the directed-dialog-processor the n-best list and the acceptance status indicator.

10. The method of claim 7, comprising:
responsive to a determination that a confidence-score value of the at least one confidence-score value in the sorted combined n-best list does not exceed a predefined threshold-confidence-score value, generating a dynamic grammar.

11. The method of claim 10, comprising:
responsive to the generation of a dynamic grammar, forwarding, to each selected speech-recognition-engine application, the modified context information, the forwarded caller response, and a request to perform a speech-recognition of the forwarded caller response; and
wherein the modified context information comprises the dynamic grammar.

12. The method of claim 7, wherein step (e) is performed after analyzing configuration files in data communication with the speech-recognition-engine server.

13. A computer-program product comprising a non-transitory computer-usable medium having computer-readable processor instructions embodied therein, the computer-readable processor instructions adapted to be executed to implement a method comprising:
(a) providing a processor;
(b) providing a memory interoperably coupled to the processor and having computer-readable processor instructions stored thereon;
(c) using the processor and the memory in combination to perform at least one of steps (d)-(i);
(d) receiving context information and a forwarded caller response from a directed-dialog-processor application executing on a directed-dialog-processor server;
(e) selecting, using the context information, a set of parallel-operable speech-recognition-engine applications from a plurality of parallel-operable speech-recognition-engine applications executing on a speech-recognition-engine server;
wherein the plurality of parallel-operable speech-recognition-engine applications each provide a different speech-recognition capability;
(f) combining the context information received in step (d) and additional context information present in a context database, thereby forming modified context information;
(g) forwarding modified context information, the forwarded caller response, and a request to perform speech recognition of the forwarded caller response to each speech-recognition-engine application selected in step (e);
(h) receiving from each speech-recognition-engine application of the set of parallel-operable speech-recognition-engine applications an n-best list comprising at least one confidence-score value and at least one word-score value;
(i) responsive to step (h), modifying the at least one confidence-score value and the at least one word-score value in each n-best list by a weight-multiplier value based on the context information provided by the directed-dialog-processor application, thereby creating a modified n-best list;
wherein each modified n-best list is combined into a single sorted combined n-best list; and
wherein the at least one confidence-score value and the at least one word-score value of the sorted combined n-best list are modified by determining presence of phrases and words of the sorted combined n-best list in the context database.

14. The computer-program product of claim 13, the method comprising:
responsive to the modification of the at least one confidence-score value and the at least one word-score value, re-sorting the sorted combined n-best list.

15. The computer-program product of claim 14, the method comprising:
responsive to a determination that a confidence-score value of the at least one confidence-score value in the sorted combined n-best list exceeds a predefined threshold-confidence-score value, setting the value of an acceptable status indicator to a value instructing the directed-dialog-processor server to accept the entry in the n-best list with the highest confidence-score value and forwarding to the directed-dialog-processor the n-best list and the acceptance status indicator.

16. The computer-program product of claim 13, the method comprising:
responsive to a determination that a confidence-score value of the at least one confidence-score value in the sorted combined n-best list does not exceed a predefined threshold-confidence-score value, generating a dynamic grammar.

17. The computer-program product of claim 16, the method comprising:
responsive to the generation of a dynamic grammar, forwarding, to each selected speech-recognition-engine application, the modified context information, the forwarded caller response, and a request to perform a speech-recognition of the forwarded caller response; and
wherein the modified context information comprises the dynamic grammar.

18. The computer-program product of claim 13, wherein step (e) is performed after analyzing configuration files in data communication with the speech-recognition-engine server.

* * * * *